United States Patent
Stephens et al.

(10) Patent No.: US 11,991,792 B2
(45) Date of Patent: May 21, 2024

(54) PORTABLE ELECTRIC HEATING MAT FOR USE BY AN ANIMAL

(71) Applicants: John Paul Stephens, Oakland, TN (US); Jeremy Gross, Nesbit, MS (US)

(72) Inventors: John Paul Stephens, Oakland, TN (US); Jeremy Gross, Nesbit, MS (US)

(73) Assignee: John Paul Stephens, Memphis, TN (US)

( * ) Notice: Subject to any disclaimer, the term of this patent is extended or adjusted under 35 U.S.C. 154(b) by 0 days.

(21) Appl. No.: 18/165,041

(22) Filed: Feb. 6, 2023

(65) Prior Publication Data
US 2023/0180353 A1 Jun. 8, 2023

Related U.S. Application Data

(63) Continuation of application No. 16/792,664, filed on Feb. 17, 2020, now Pat. No. 11,602,014.

(Continued)

(51) Int. Cl.
*H05B 1/02* (2006.01)
*A01K 29/00* (2006.01)
(Continued)

(52) U.S. Cl.
CPC ........... *H05B 1/0272* (2013.01); *A01K 29/00* (2013.01); *H05B 3/04* (2013.01); *H05B 3/56* (2013.01);
(Continued)

(58) Field of Classification Search
CPC .......... H05B 1/0272; H05B 3/36; H05B 3/04; H05B 3/56; H05B 2203/036; H05B 2203/014; H05B 2203/003; A01K 29/00
See application file for complete search history.

(56) References Cited

U.S. PATENT DOCUMENTS

| 1,620,581 A | 3/1927 | Smith |
| 4,752,263 A | 6/1988 | Pritchard et al. |

(Continued)

FOREIGN PATENT DOCUMENTS

| DE | 202006003995 U1 | 7/2006 |
| GB | 2564683 A | 1/2019 |
| WO | 8810057 | 12/1988 |

OTHER PUBLICATIONS

Advertisement for Gerbing 7V Battery Heated Hunting Blind Cushion found on the internet at https://www.thewarmingstore.com/gerbings-blind-heat-seat-cushion.html, Dec. 8, 2012.

*Primary Examiner* — Dana Ross
*Assistant Examiner* — Kuangyue Chen
(74) *Attorney, Agent, or Firm* — Capitol City TechLaw

(57) ABSTRACT

An electric heating mat may include an outer sleeve having an interior, and an access end with an opening to the interior. The access end may be folded upon itself into a closed condition, and unfolded into an opened condition. When the access end is closed, the interior of the outer sleeve may provide a sealed enclosure. The sealed enclosure may accommodate and protect internal components, such as heating elements, a power source, and associated controls. The heating elements, associated wiring, and an insulation layer may be provided in an inner sleeve, which may be insertable into the outer sleeve as a unit. When the access end is opened, the opening provides access to the internal components. Such access allows the power source to be turned on to supply power to the heating elements.

12 Claims, 5 Drawing Sheets

Related U.S. Application Data

(60) Provisional application No. 62/924,453, filed on Oct. 22, 2019.

(51) Int. Cl.
  *H05B 3/04* (2006.01)
  *H05B 3/56* (2006.01)

(52) U.S. Cl.
  CPC .. *H05B 2203/003* (2013.01); *H05B 2203/036* (2013.01)

(56) References Cited

U.S. PATENT DOCUMENTS

| | | |
|---|---|---|
| 5,911,193 A | 6/1999 | Johnson |
| 6,189,487 B1 | 2/2001 | Owen et al. |
| 6,966,275 B2 | 11/2005 | Whitehill |
| 8,015,942 B2 | 9/2011 | Koskey, Jr. |
| 9,061,808 B2 | 6/2015 | Echauz |
| 9,668,303 B2 | 5/2017 | Augustine et al. |
| 2006/0288949 A1 | 12/2006 | Axinte et al. |
| 2007/0238375 A1 | 10/2007 | Arenson et al. |
| 2008/0093356 A1 | 4/2008 | Pizzi |
| 2008/0283513 A1 | 11/2008 | Ferguson, III et al. |
| 2011/0220634 A1 | 9/2011 | Yeh |
| 2012/0122636 A1 | 5/2012 | Shurtleff |
| 2012/0234247 A1 | 9/2012 | Graves et al. |
| 2012/0273479 A1 | 11/2012 | Kim |
| 2016/0302262 A1 | 10/2016 | Hsu |
| 2016/0330797 A1 | 11/2016 | Gustafson |
| 2017/0311388 A1 | 10/2017 | Hsu |
| 2018/0172284 A1 | 6/2018 | Bareyt et al. |
| 2019/0217548 A1 | 7/2019 | Augustine et al. |
| 2020/0003487 A1 | 1/2020 | Brown |

PORTABLE ELECTRIC HEATING MAT FOR USE BY AN ANIMAL

This application is a continuation application of U.S. patent application Ser. No. 16/792,664 filed Feb. 17, 2020, which claims priority under 35 USC 119(e) to U.S. Provisional Application No. 62/924,453 filed on Oct. 22, 2019, the entire contents of both of which are incorporated herein by reference.

BACKGROUND

1. Field

Embodiments relate in general to electric heating pads, and more specifically, to an electric heating pad that is portable and can be used as a mat for an animal.

2. Discussion of Related Art

Electric heating pads have been employed as mats for humans, canines, and other animals for many years. Conventional mats that utilize electric heating elements are available in many forms. The heating elements may receive power through a power cord that requires connection to an AC power outlet. The heating elements may also receive power from a portable power source such as a battery pack.

Although conventional electric heating mats are generally thought to provide acceptable performance, they are not without shortcomings. The shortcomings may include the components of the mat being susceptible to contamination and damage if the mat is employed in harsh environments. By way of example only, a harsh environment may be experienced during a waterfowl hunt. It is common to use a dog as a retriever to hunt waterfowl. The dog may enter and exit the water on numerous occasions to retrieve downed birds. Between retrieves, the dog may stay in a duck blind or boat away from view of passing waterfowl.

If a conventional electric heating mat were employed to heat the dog (and/or the hunter), liquids and/or debris may penetrate into the interior of the mat and contaminate insulation layers, the heating elements, and/or other internal components. Also, some components may be situated on the outside of the mat itself. Such components may be damaged by impacts, dirt, dust, sand, moisture, or liquids, for example, rain, spills, splashes, etc. This is especially the case when the external components are electrical in nature, e.g., sensors, switches, buttons, batteries, wiring, controls, etc.

Thus, a need exists for a more robust and rugged portable electric heating mat in which the components can be protected and isolated from the external environment of the mat.

SUMMARY

According to a non-limiting embodiment, an electric heating mat may include an outer sleeve having an interior, and an access end with an opening to the interior. A heating element may be provided in the interior of the outer sleeve. A power source may be provided in the interior of the outer sleeve. The power source may be electrically connected to the heating element. The access end may provide a reversible closure to the interior of the outer sleeve.

According to another non-limiting embodiment, an electric heating mat kit may include an outer sleeve having an interior, and an access end with an opening to the interior. A heating element may be removably insertable into the interior of the outer sleeve. A power source may be removably insertable into the interior of the outer sleeve. The power source may be electrically connectable to the heating element. The access end may provide a reversible closure to the interior of the outer sleeve.

According to another non-limiting embodiment, a method may be provided for using an electric heating mat that may have an outer sleeve with an access end that provides a reversible closure to an interior of the outer sleeve. The interior of the outer sleeve may accommodate a heating element, a battery pack, and a controller. The method may involve unfolding the access end to an opened condition to expose an opening to the interior of the outer sleeve. The controller may be removed from the interior of the outer sleeve by passing the controller through the opening. The controller may be operated to power the battery pack to supply power to the heating element. The controller may be returned to the interior of the outer sleeve by passing the controller through the opening. The access end may be folded to a closed condition, such that the opening is flattened and situated between folds of the access end.

The above and other features, including various and novel details of construction and combinations of parts will be more particularly described with reference to the accompanying drawings. It will be understood that the details of the example embodiments are shown by way of illustration only and not as limitations of the invention. The principles and features of this invention may be employed in varied and numerous embodiments without departing from the scope of the invention.

BRIEF DESCRIPTION OF THE DRAWINGS

Non-limiting embodiments will become more fully understood from the detailed description below and the accompanying drawings, wherein like elements are represented by like reference numerals, which are given by way of illustration only and thus are not limiting of the present invention.

DESCRIPTION OF NON-LIMITING EMBODIMENTS

This disclosure is directed to a portable electric heating mat that includes a heating element coupled to a power source, such as a battery pack. Numerous and varied heating elements and battery packs are well known in this art, and the invention is not limited to any particular type of heating element or battery pack (or other power source).

Throughout this disclosure, terms relating to spatial directions (e.g., upper, top, lower, bottom, front, forward, rear, rearward, proximal, distal, etc.) are used for convenience in describing features or portions thereof, as shown in the figures. These terms do not, however, require that the disclosed structure be maintained in any particular orientation.

In this disclosure, the term "sealed enclosure" means that the enclosure is protected against the intrusion of matter from the surrounding environment. The level of protection may vary from one embodiment to the next. For example, the degree of protection may include protection against the intrusion of water or other liquid that splashes against the outside of the mat from any direction (like the splashing that would occur if a drink were spilled on the mat, if the mat were left out in the rain, if the mat were held under running water, or if the mat were dropped in a pool of water, for example). In alternative embodiments, more protection may be provided. For example, the mat may provide a sealed enclosure that is waterproof under pressure. Here, the enclosure can be protected against the intrusion of water or other liquid even when the mat is completely submerged in water or other liquid.

Figure 1:
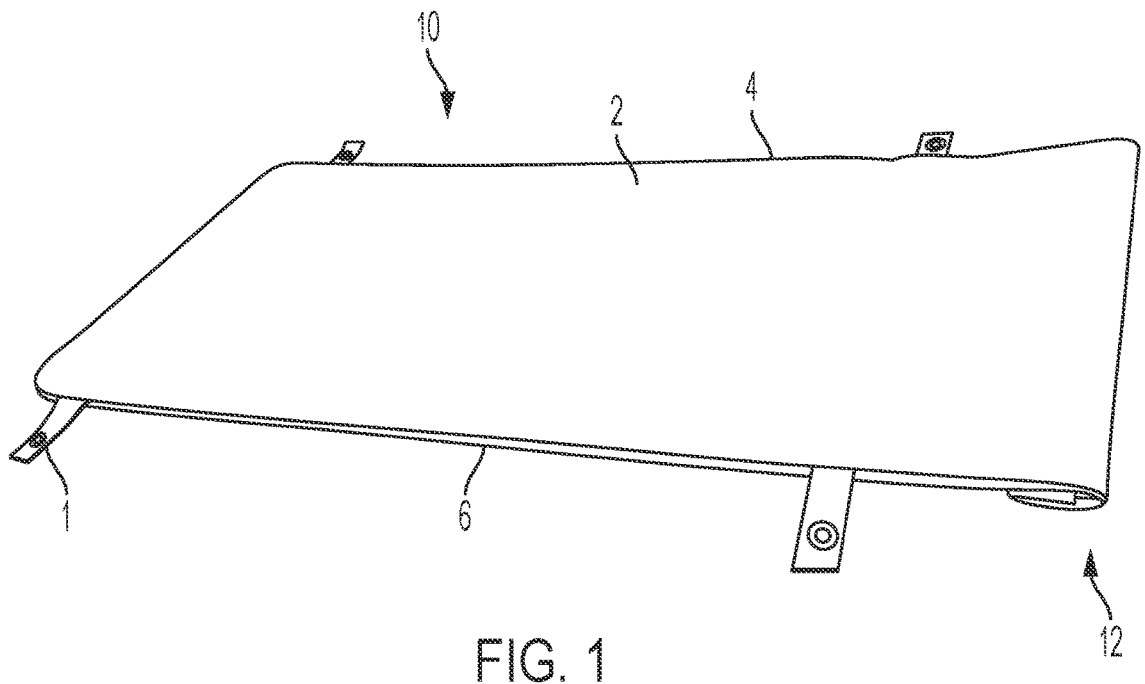
FIG. 1 is a front, top, and right side perspective view of an electric heating mat according to a non-limiting embodiment.
Figure 2:
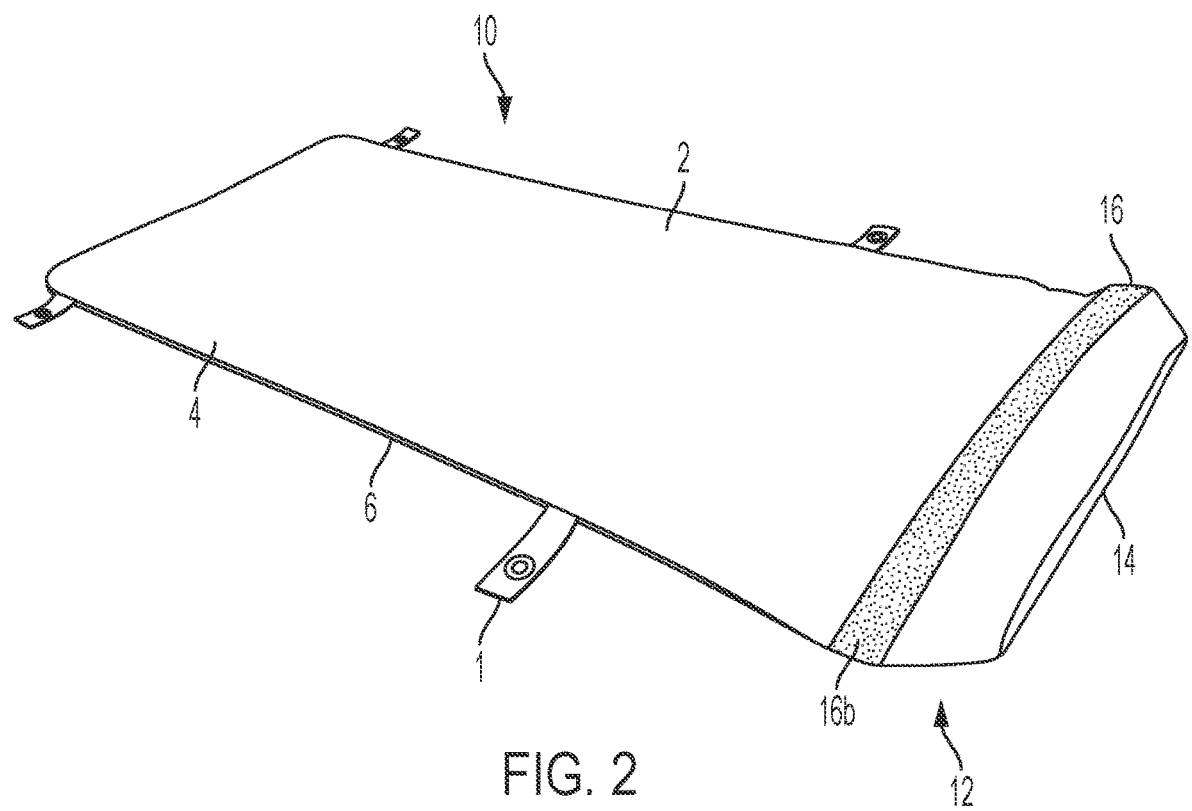
FIG. 2 is another front, top, and right side perspective view of the electric heating mat in an opened condition.

The Outer Sleeve:

With reference to FIGS. 1 and 2, the mat 10 includes an outer sleeve 2 having a generally rectangular shape, but the invention is not limited to any shape or size. The sleeve 2 is provided with attachment points in the form of grommets 1 that can be used to secure the mat 10 in place upon a supporting surface (e.g., a duck blind or boat). It will be appreciated that numerous and varied attachment points that are well known in this art can be suitably implemented. It will also be appreciated that the number and location of the attachment points can be varied.

The outer sleeve 2 can be formed by an upper material sheet 4 and a lower material sheet 6 that are joined together along their peripheral edges, i.e., along three peripheral edges in this non-limiting embodiment. The material sheets 4, 6 can be joined together using stitching, adhesives, rivets, welds, or any other mechanism that mechanically links the two material sheets 4, 6 together. A combination of mechanical linkages may be implemented between the material sheets 4, 6 to improve structural reliability and sealing effectiveness. Sealants and/or gaskets can also be suitably implemented at the connections between the material sheets 4, 6. In the illustrated embodiment, two material sheets are attached together to form the outer sleeve 2. It will be appreciated that more or less two material sheets may be suitably implemented. For example, a single sheet may be folded upon itself and peripheral edges joined together to form the outer sleeve.

The material sheets 4, 6 can be fabricated from durable and flexible materials, which are well known in this art. In the illustrated embodiment, and by way of example only, the material sheets 4, 6 may be fabricated from 1000 denier coated Cordura® nylon fabric. The coating (e.g., urethane), which improves water resistance, may be situated on the inside of the sleeve 2 to improve the comfort of the resting animal. Alternative material sheets may be suitably implemented, including textiles, fabrics, and cloths. Furthermore, each material sheet 4, 6 may include multiple layers of materials assembled together and used in combination. Conventional coatings may also be applied to the material sheets 4, 6 to improve comfort for the animal, achieve thermal characteristics, and/or provide other characteristics to the mat.

The outer sleeve 2 has an access end 12 with an opening 14 (FIG. 2). The access end 12 can be manipulated back and forth between a closed condition and an opened condition to provide a reversible closure to an interior of the outer sleeve 2. As shown in FIG. 2, the opening 14 is the only opening provided to the interior of the outer sleeve 2.

FIG. 1 illustrates the access end 12 in a closed condition. Here, the access end 12 may be folded upon itself three times and held in the folded condition by a fastener (not shown in FIG. 1). The opening 14 is flattened and situated between the folds of the access end 12. When the access end 12 is closed, the outer sleeve 2 provides a sealed enclosure that accommodates and protects internal components from the surrounding environment.

FIG. 2 illustrates the access end 12 in an opened condition. Here, the access end 12 is unfolded and the opening 14 is available for gaining access to the components in the interior of the outer sleeve 2. In this non-limiting embodiment, the fastener 16 is a hook-and-loop fastener, such as those sold under the name Velcro®. One portion of the fastener 16 (e.g., the loop component 16b) is attached to the upper material sheet 4. The other portion of the fastener 16 (e.g., the hook component 16a), which is not shown in FIG. 2, is attached to the lower material sheet 6.

Figure 3:
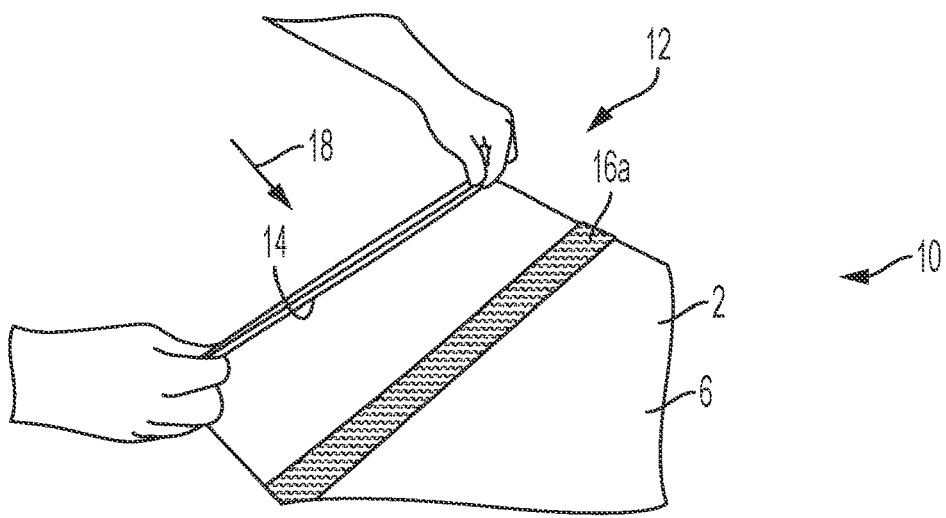
FIGS. 3-5 are partial rear, bottom and right side perspective views showing sequential manipulation of an outer sleeve.
Figure 4:
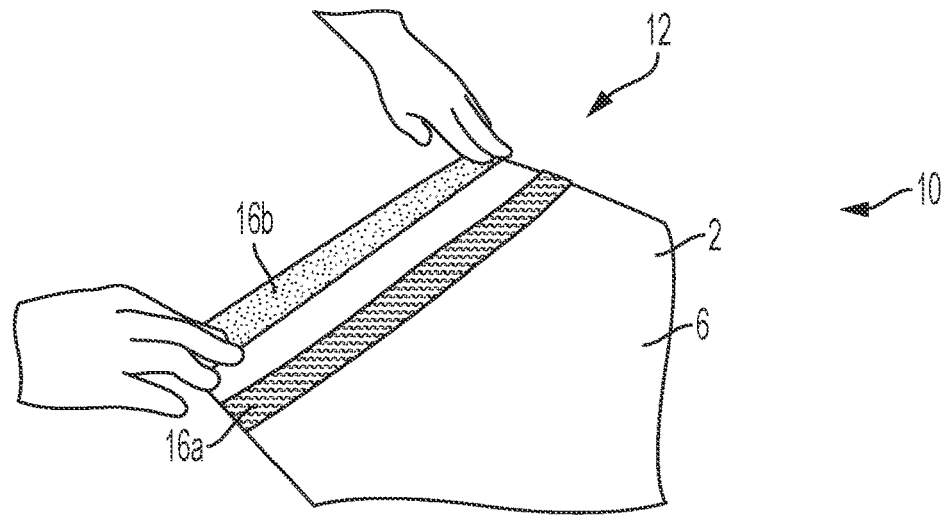
Figure 5:
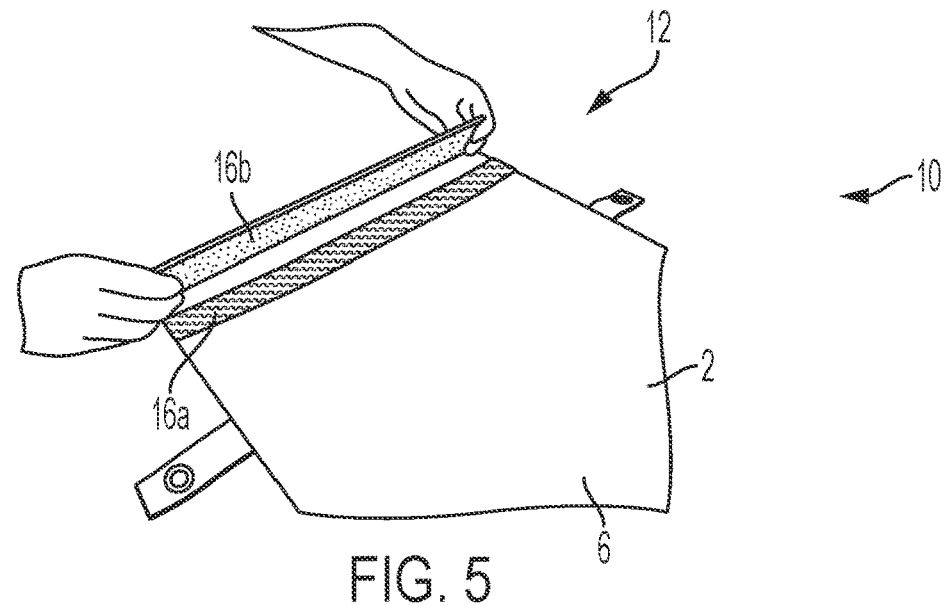

FIGS. 3-5 sequentially illustrate the access end 12 being folded from the opened condition to the closed condition. In FIGS. 3-5, the outer sleeve 2 is situated such that the lower material sheet 6 and the hook component 16a of the fastener 16 face upward. Starting with FIG. 3, a distal most portion of the access end 12 (including the opening 14) is folded over onto the lower material sheet 6 in a folding direction (arrow 18). Then, as shown in FIG. 4, the access end 12 is folded over again onto the lower material sheet 6 in the folding direction (arrow 18). Both the hook component 16a and the loop component 16b of the fastener 16 can be seen in FIG. 4. Finally, as shown in FIG. 5, the access end 12 is folder over a third time onto the lower material sheet 6 in the folding direction (arrow 18). As a result of the third fold, the hook and the loop components 16a, 16b of the fastener 16 cab be pressed together to fasten the access end 12 in the closed condition. To go back to the opened condition, the access end 12 can be pulled away from the lower material sheet 6 to peel the hook and the loop components 16a, 16b apart, thereby allowing the access end 12 to be unfolded and exposing the opening 14.

It will be appreciated that the hook and the loop components 16a, 16b are provided on opposite sides of the outer sleeve 2. Moreover, the hook and the loop components 16a, 16b are spaced apart from each other in the folding direction (arrow 18 in FIG. 3) of the access end 12, so that the two components 16a, 16b can interact with each other when the access end 12 is folded over upon itself. The hook and the loop components 16a, 16b can be provided at alternative locations on the outer sleeve 2 to adjust the distance between the components 16a, 16b in the folding direction, such that the access end 12 can be folded over onto itself more or less than 3 times and fastened in the folded condition.

In the illustrated embodiment, the fastener 16 is a hook-and-loop fastener. Such hook-and-loop fasters may be waterproof, as is well known in this art, and this may improve sealing effectiveness when the access end 12 is in the closed condition. Instead of a hook-and-loop fastener, numerous and varied alternative reversible fasteners may be suitably implemented. Such alternative fasteners, which are well known in this art, may include buttons, snaps, straps, buckles, zippers, and clips, for example.

Figure 6:
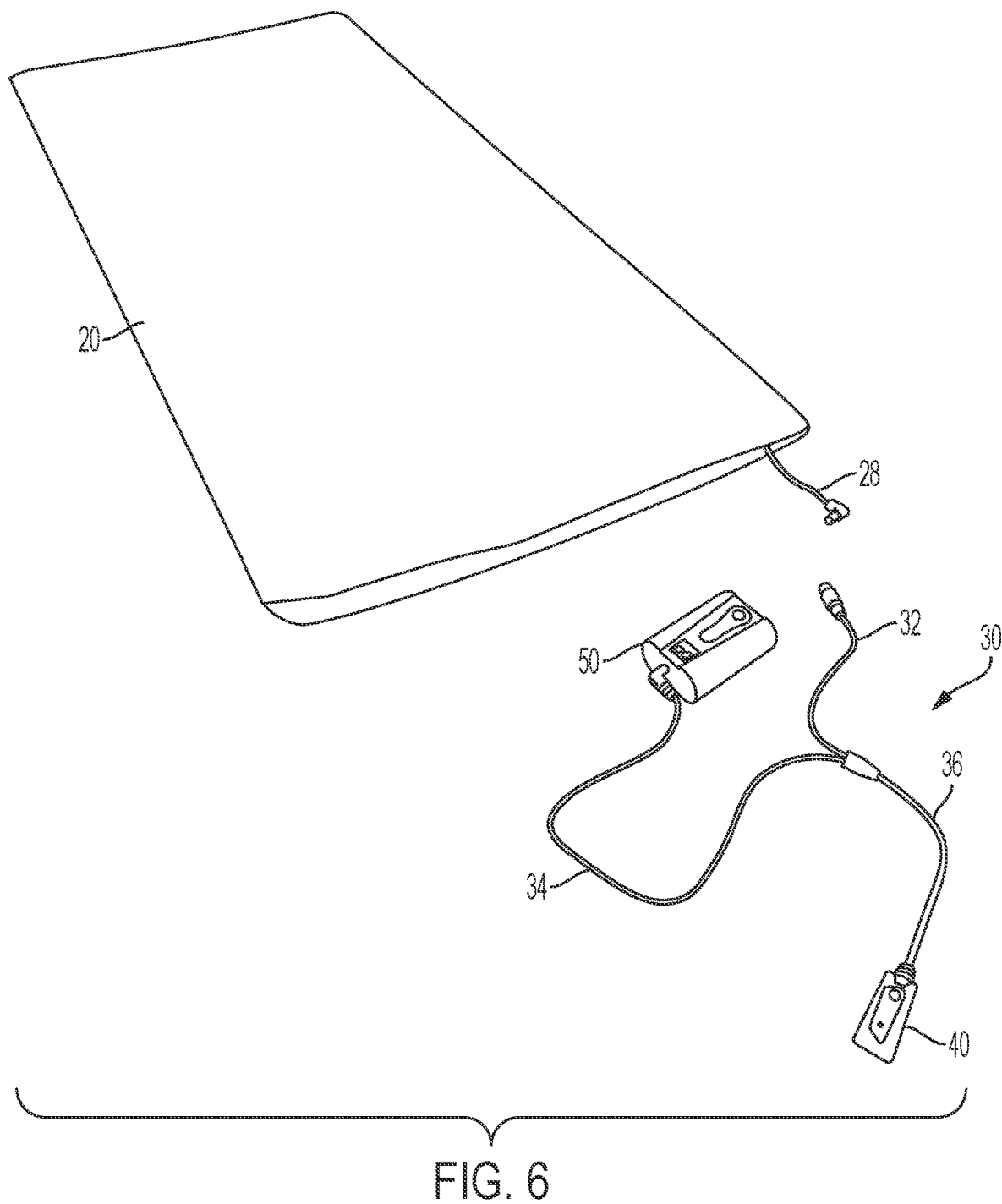
FIG. 6 is front, top, and right side perspective view of internal components.

Internal Components:

The outer sleeve 2 may cover and protect internal components, such as those shown in FIG. 6. These components can be inserted into and removed from the outer sleeve 2 via the opening 14 provided in the access end 12. In this non-limiting embodiment, the internal components may include an inner sleeve 20 (which covers heating elements), a battery pack 50, a controller 40, and associated cabling 30.

The inner sleeve 20 may have a shape and size corresponding to the shape and size of the outer sleeve 2. In this way, the inner sleeve 20 may fit closely with interior surfaces of the outer sleeve 2 that define the sealed enclosure. But the inner sleeve 20 is not limited to any shape or size. The inner sleeve 20 can be fabricated from numerous and varied flexible materials, which are well known in this art. Such materials include but are not limited to textiles, fabrics, and cloths. The inner sleeve 20 need not be water resistant or sealed closed as it can be situated in the sealed enclosure of the outer sleeve 2.

As will be discussed in more detail below, the inner sleeve 20 covers one or more heating elements, associated wiring, and insulation layers. A power cord 28 extends through an opening in the inner sleeve 20. The power cord 28 supplies power to the heating elements within the inner sleeve 20. When the inner sleeve 20 is inserted into the outer sleeve 2, the power cord 28 may be situated toward the access end 12 of the outer sleeve 2. The power cord 28 may be removably connected to a power source, such as the battery pack 50, using a splitter cable 30.

The splitter cable 30 may have a first end 32 removably connectable to the power cord 28, a second end 34 removably connectable to the battery pack 50, and a common end 36 connected to a push-button controller 40. The removable connections between the power cord 28, the splitter cable 30, and the battery pack 50 can be provided by conventional electrical connectors that are well known in this art. Although not shown in FIG. 6, the battery pack 50 and/or the controller 40 may be removably mounted on the exterior of the inner sleeve 20 via a pocket, straps, clips, or other conventional fasteners that are well known in this art.

The controller 40 may include push buttons that can be operated to turn the battery pack 50 off and on, and select settings for power delivery to the heating elements within the inner sleeve 20. Numerous and varied alternative controllers, which are well known in this art, can be suitably implements. Further, in some embodiments, the controller may be incorporated into the battery pack itself. Here, buttons or switches may be provided on the housing of the battery pack. And the splitter cable may be dispensed with in favor of a cable having two ends that can be removably connectable to the battery pack and the power cord, respectively.

Figure 7:
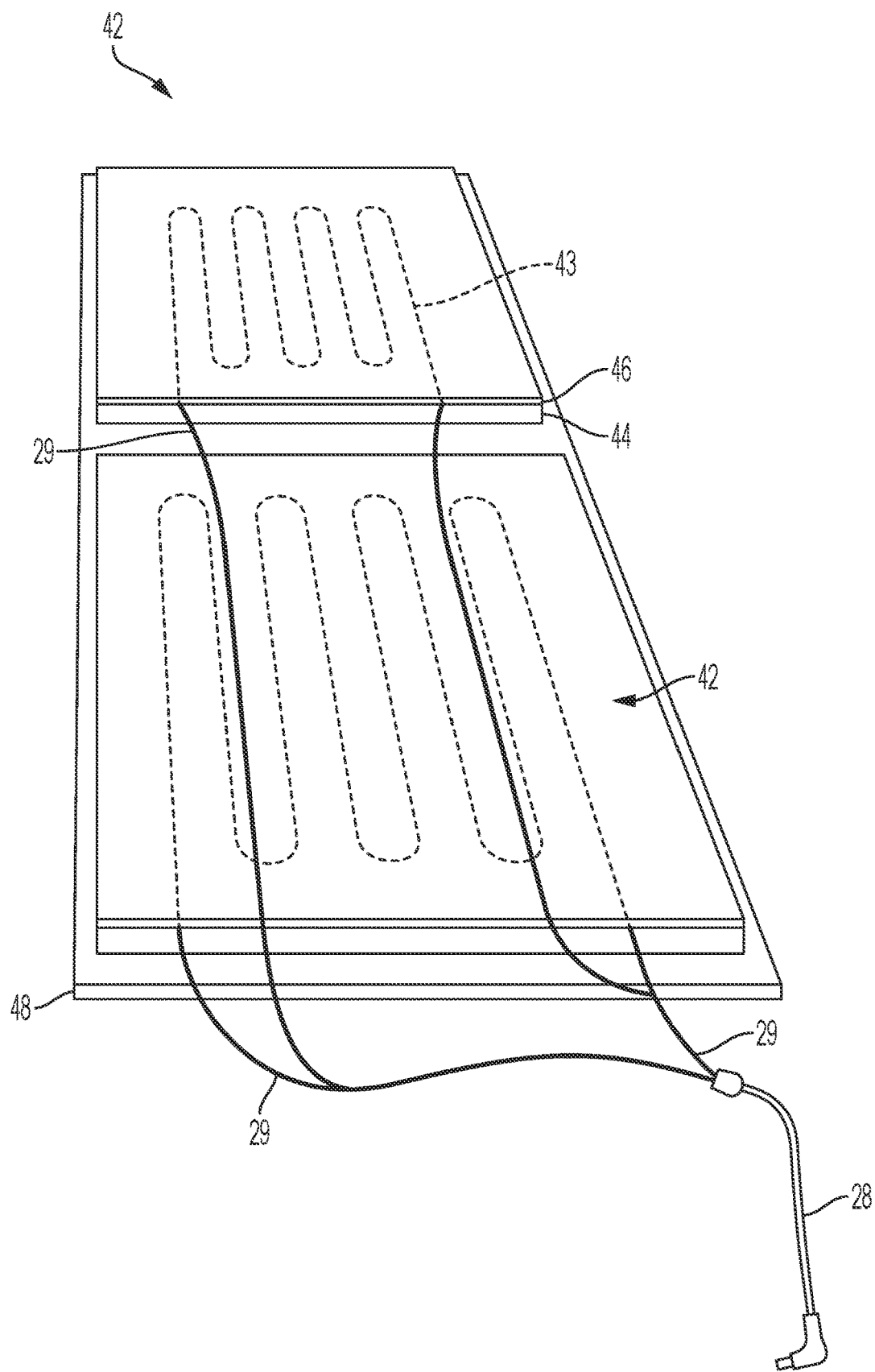
FIG. 7 is a front and top perspective view of the contents of an inner sleeve.

FIG. 7 illustrates components that may be provided in the interior of the inner sleeve 20, inclusive of heating elements 42, associated wiring 29, and an insulation layer 48. In this non-limiting embodiment, two heating elements 42 are provided on the insulation layer 48. In alternative embodiment, more or less than two heating elements may be suitably implemented.

The insulation layer 48 is disposed on only one side of the heating elements 42, i.e., the downward facing side of the heating elements 42. When the inner sleeve 20 is inserted into the outer sleeve 2, the insulation layer 48 may be interposed between the heating elements 42 and the lower material sheet 6 of the outer sleeve 2. At this location, the insulation layer 48 may push heat up to an animal resting on the mat 10. In alternative embodiments, a plurality of insulation layers may be stacked, and the heating elements may be situated in the stack as desired.

By way of example only, the insulation layer 48 may be fabricated from a silica aerogel material, such as those sold under the name Pyrogel® HPS by Aspen Aerogels, Inc. Numerous and varied insulation materials, which are well known in this art, can be suitably implemented.

The heating elements 42 are conventional. By way of example only, each heating element 42 may be an electric resistance wire 43 (or heater wire) laid out in a serpentine fashion and fixed between a backing layer 44 and a fixing layer 46 using adhesive, stitching, clips, tape, etc. The backing layer 44 and the fixing layer 46 may be fabricated from conventional materials that are well known in this art. It will also be appreciated that the spacing, fill, and arrangement of the heater wire 43 can be varied as needed. The heater wire 43 is electrically connected to the power cord 28 via wiring 29 in a well-known and conventional fashion.

In the illustrated embodiment, the heating elements include a heater wire, but the invention is not so limited. For example, alternative embodiments may include heating elements that implement electrically conductive sheet-like heaters, electrically conductive fabric heaters, electrically conductive paste heaters, foils, etc., which are well known in this art.

Using the Mat:

The following description describes the use of the mat 10 during a waterfowl hunt, where a hunting dog may rest on the mat to be warmed. The mat 10 may of course be used in numerous alternative environments, and to warm other animals (besides a hunting dog).

At an initial set up, the inner sleeve 20 (and its contents including the heating elements 42, the associated wiring 29, and the insulation layer 48), the power cord 28, the splitter cable 30, the controller 40, and the battery back 50 may be provided in the interior of the outer sleeve 2. The access end 12 of the outer sleeve 2 may be folded and fastened in the closed condition so that the interior provides a sealed enclosure that accommodates and protects the internal components from the surrounding environment. During a waterfowl hunt, the mat 10 may be inadvertently dropped into a body of water. The outer sleeve 2 may prevent water from entering the sealed enclosure, and this may allow the mat 10 to float on the water until retrieved by the hunter.

To turn on the mat 10, the access end 12 can be pulled to release the hook-and-loop fastener, thereby allowing the access end 12 to be unfolded to the opened-condition and exposing the opening 14. The hunter can reach through the opening 14 and remove the controller 40 from the outer sleeve 2. The hunter may manipulate the controller to power on the battery pack 50 and select the desired heat setting. The hunter then returns the controller 40 back into the outer sleeve 2, and closes and fastens the access end 12. The hunting dog can rest on and be warmed by the mat 10. Water and other debris may fall from the hunting dog and onto the mat 10. Here again, the outer sleeve 2 may prevent the water and debris from entering the sealed enclosure and contaminating the internal components.

To turn off the mat 10, the hunter opens the access end 12 and removes the controller 40 to power off the battery pack 50.

When the access end 12 is in the opened condition, the battery pack 50 may be removed from the outer sleeve 2 for recharging. Here, the battery pack 50 may be disconnected from the splitter cable 30 and/or the splitter cable 30 may be disconnected from the power cord 28.

The mat 10 offers modularity in that the access end 12 can be opened, and the internal components removed and separated from each other for replacement and/or repair.

Alternative Embodiment with a Mesh Insert

An alternative, non-limiting embodiment may implement a mesh insert to facilitate drainage of liquid away from a resting animal.

Figure 8:
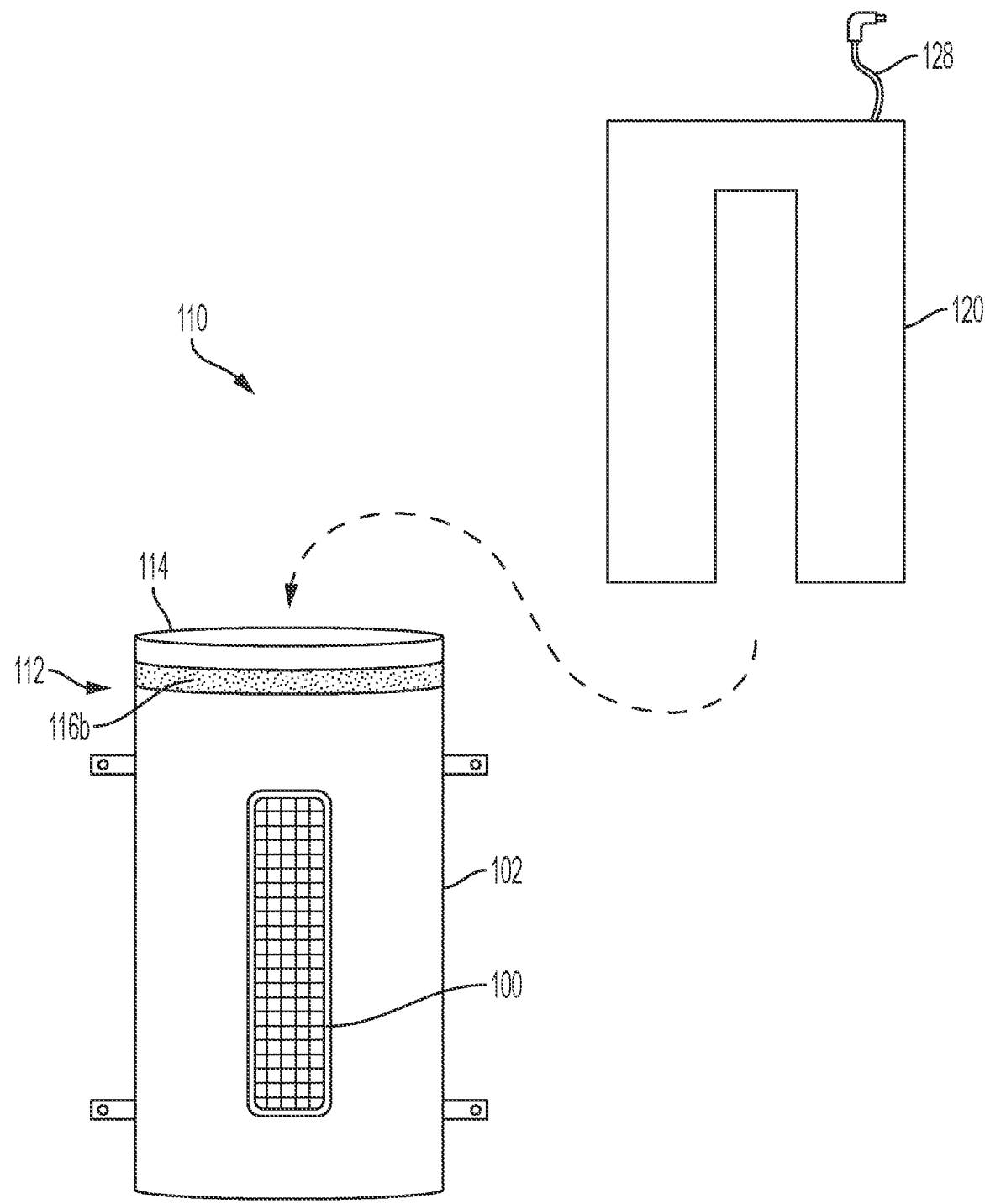
FIG. 8 is front view of an electric heating mat according to another non-limiting embodiment.

With reference to FIG. 8, the mesh insert 100 may be fixed to the outer sleeve 102. The mesh insert 100 may have a generally rectangular shape, but the invention is not limited in this regard. The mesh inert 100 may allow passage of liquid from one side of the outer sleeve 102 to the other, and without entering into the interior of the outer sleeve 102. Here, the interior of the outer sleeve 102 may extend all the way around the mesh insert 100. The material sheets of the outer sleeve 102 may be joined together at the periphery of the mesh insert 100 (and fixing the mesh insert in place) using stitching, adhesives, rivets, welds, or any other mechanical linking mechanisms that are well known in this art.

As in the previous embodiments, the outer sleeve 102 has an access end 112 that can be folded and fastened in a closed condition to provide a sealed enclosure, and unfolded to an opened condition to expose an opening 114. A loop portion 116b of the fastener is shown in FIG. 8. When the access end 112 is opened, the inner sleeve 120 may be inserted into (or removed from) the outer sleeve 102. As in the previous embodiments, a power cord 128 extends from the inner sleeve 120. The power cord 128 supplies power to heating elements (not shown) within the inner sleeve 120. The power cord 128 may also be removably connected to a power source (not shown).

The inner sleeve 120 is shaped and sized to fit closely with interior surfaces of the outer sleeve 102. By way of example only, the inner sleeve 120 is "U" shaped to facilitate insertion into the outer sleeve 102. Specifically, upon insertion into the outer sleeve 102, the inner sleeve 120 may extend around three sides of the mesh insert 100. The inner sleeve 120 may not extend around the end of the mesh insert 100 that faces away from the access end 112 of the outer sleeve 102. The interior of this portion of the outer sleeve 102 may be filled with conventional insulation materials.

Although the foregoing description is directed to non-limiting embodiments of the present teachings, it is noted that other variations and modifications will be apparent to those skilled in the art, and which may be made without departing from the spirit or scope of the present teachings.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described to explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What is claimed is:

1. An electric heating mat comprising:
    an outer sleeve having an interior, and an access end with an opening to the interior;
    a heating element provided in the interior of the outer sleeve; and
    a power source provided in the interior of the outer sleeve;
    wherein the access end provides a reversible closure to the interior of the outer sleeve; and
    wherein the opening in the access end is the only opening provided to the interior.

2. The electric heating mat according to claim 1, further comprising controls for operating the power source to supply power to the heating element;
    wherein the controls are provided in the interior of the outer sleeve.

3. The electric heating mat according to claim 1, wherein the access end is movable into (a) a closed condition in which the interior is a sealed enclosure that accommodates the heating element and the power source, and (b) an opened condition in which the opening provides access to the interior of the outer sleeve.

4. The electric heating mat according to claim 3, wherein the access end is folded upon itself at least three times in the closed condition.

5. The electric heating mat according to claim 4, further comprising a fastener to hold the access end in the closed condition.

6. The electric heating mat according to claim 5, wherein the fastener includes a hook portion and a loop portion respectively provided on opposite facing sides of the access end.

7. The electric heating mat accordingly to claim 1, wherein when the access end is in the closed condition, the sealed enclosure is waterproof and the electric heating mat is floatable in a body of water.

8. The electric heating mat according to claim 1, further comprising:
    an inner sleeve; and
    an insulation layer provided in the inner sleeve;
    wherein the heating element is provided in the inner sleeve and positioned on top of the insulation layer; and
    wherein the inner sleeve is removably inserted into the outer sleeve, such that the insulation layer is interposed between the heating element and a lower material sheet of the outer sleeve.

9. The electric heating mat according to claim 1, wherein the heating element includes an electric resistance wire laid out in a serpentine fashion.

10. The electric heating mat according to claim 1, wherein the power source is a rechargeable battery pack.

11. An electric heating mat kit comprising:
    an outer sleeve having an interior, and an access end with an opening to the interior;
    a heating element removably insertable into the interior of the outer sleeve; and
    a power source removably insertable into the interior of the outer sleeve;
    wherein the access end provides a reversible closure to the interior of the outer sleeve; and
    wherein the opening in the access end is the only opening provided to the interior.

12. A method of using an electric heating mat having an outer sleeve with an access end that provides a reversible closure to an interior of the outer sleeve, the interior of the outer sleeve accommodating a heating element, a battery pack, and a controller, the method comprising:
    unfolding the access end to an opened condition to expose an opening to the interior of the outer sleeve;
    wherein only a single opening is provided to the interior of the outer sleeve;
    removing the controller from the interior of the outer sleeve by passing the controller through the opening;
    operating the controller to power the battery pack;
    returning the controller to the interior of the outer sleeve by passing the controller through the opening; and folding the access end to a closed condition, such that the opening is flattened and situated between folds of the access end.

\* \* \* \* \*